B. LEIBBRANDT.
STEAM COOKER.
APPLICATION FILED DEC. 13, 1915.
1,174,590.
Patented Mar. 7, 1916.
2 SHEETS—SHEET 1.
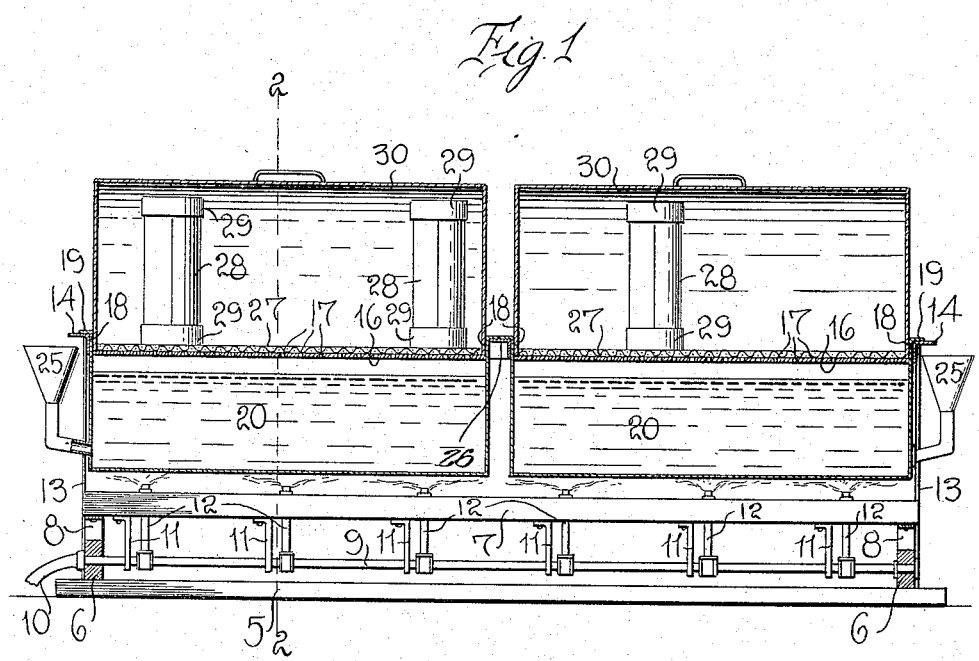
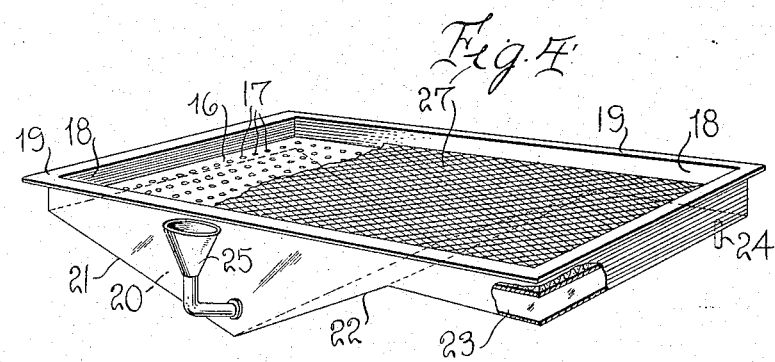
Inventor
BERTHA LEIBBRANDT
By Watson E. Coleman
Attorney

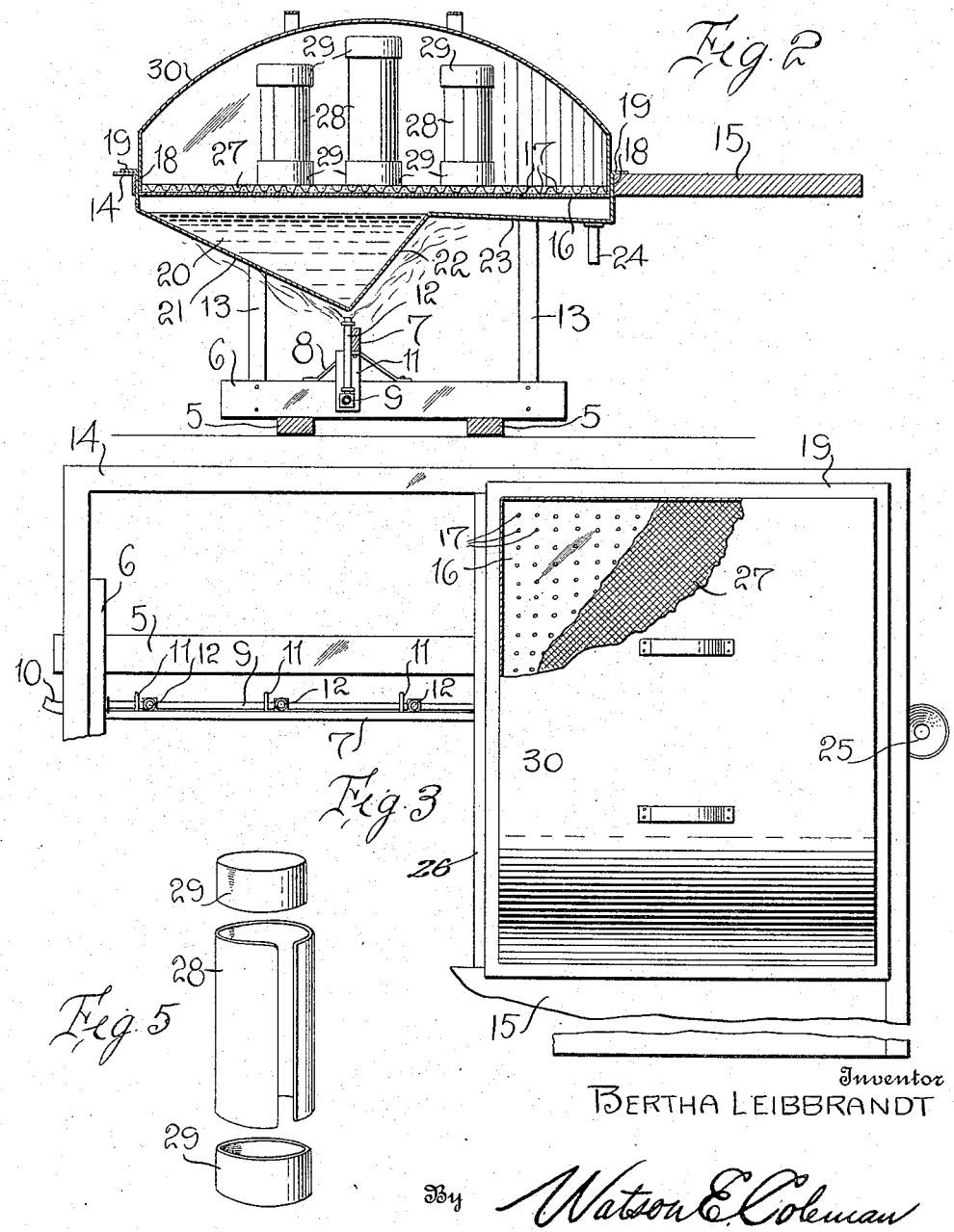

UNITED STATES PATENT OFFICE.

BERTHA LEIBBRANDT, OF SANTA CRUZ, CALIFORNIA.

STEAM-COOKER.

1,174,590.   Specification of Letters Patent.   Patented Mar. 7, 1916.

Application filed December 13, 1915. Serial No. 66,650.

*To all whom it may concern:*

Be it known that I, BERTHA LEIBBRANDT, a citizen of the United States, residing at Santa Cruz, in the county of Santa Cruz and State of California, have invented certain new and useful Improvements in Steam-Cookers, of which the following is a specification, reference being had to the accompanying drawings.

This invention relates to an improved steam cooker and has for its primary object to provide a cooking or baking apparatus which is particularly designed for use in the manufacture of loaf bread prepared from the food compound described and claimed in my prior application for patent, filed January 2, 1915, Serial No. 263.

Generically stated, the present invention has for its primary object to provide a cooking or baking apparatus wherein the food arranged in suitable containers will be uniformly cooked by the application of steam to the container walls.

It is a more particular object of the invention to provide an apparatus of the above character having a perforated floor and a sub-adjacent water receiving chamber, said chamber having a lateral overflow outlet in spaced relation to said floor, and a housing or cover to inclose the food containers arranged above the perforated floor and constituting a steam receiving chamber.

It is another object of my invention to provide a steam cooking and baking apparatus which is simple in its construction, inexpensive to manufacture, and highly reliable and serviceable for the intended purpose.

With the above and other objects in view, my invention consists in the novel features of construction, combination and arrangement of parts to be hereinafter more fully described, claimed and illustrated in the accompanying drawings, in which, Figure 1 is a vertical longitudinal sectional view of a steam cooker illustrating the preferred embodiment of my invention; Fig. 2 is a transverse section thereof taken on the line 2—2 of Fig. 1; Fig. 3 is a top plan view, one of the steam generating chambers being removed; Fig. 4 is a perspective view of the steam generating chamber; and Fig. 5 is a similar view of one of the food containers with the caps or closures removed.

Referring in detail to the drawings, 5 designates parallel horizontal sill bars which are rigidly connected to each other at their opposite ends by the transverse bars or beams 6. A centrally disposed upper longitudinal bar 7 is mounted upon these transverse bars and rigidly connected thereto by means of the brace irons 8. In the illustrated embodiment of my invention, I have shown the steam cooker or baking apparatus as equipped for the use of gas as a fuel, and to this end the gas pipe 9 is mounted at its ends in the transverse bars 6, and to one end of this pipe a flexible hose or tube, indicated at 10, is connected and adapted to be attached at its other end to a service pipe. The gas pipe 9 is supported and rigidly braced by means of a plurality of hanger brackets 11 which are fixed to the longitudinal bar 7. A plurality of spaced burners 12 extend vertically upward from the gas supply pipe 9.

To each of the transverse bars 6, adjacent the ends thereof, the uprights 13 are fixed, and to the upper ends of these uprights a substantially rectangular metal frame 14 is secured. The frame bars are of angular form in cross-section and of U-shaped form in plan, and the extremities thereof are connected by the horizontally disposed table board 15 which provides a convenient support for the baking cans or containers.

Upon reference to Fig. 4 of the drawings, the preferred type of steam generating chamber will be observed. This chamber includes a floor or supporting wall 16 for the food cans or containers, which is perforated as at 17, and surrounded by an upstanding marginal wall 18 having an outwardly projecting flange 19 on its upper edge. The water receiving chamber 20 is disposed beneath this perforated supporting wall 16 and the bottom wall thereof includes a section, indicated at 21, which is inclined downwardly from a depending extension of one of the longitudinal marginal walls 18, and a second wall section 22 which is inclined upwardly at a much greater degree from the lowest point of the wall 21, said inclined wall 22 terminating at its upper edge inwardly of the opposite longitudinal vertical wall 18 and below the perforated floor or supporting wall 16. The wall 23 is extended outwardly and downwardly at a slight inclination from the wall 22 to the longitudinal vertical wall 18, and at one end of this transversely inclined wall 23 an outlet spout or tube 24 is connected thereto. To one of the end walls of the water receiving chamber, at the lowest point thereof, a suitable funnel 25 is connected, into which the water is poured in filling the chamber. It will be noted from reference to Fig. 2, that the water cannot rise above the level indicated and, therefore, there will always be a space between the surface of the water and the under side of the perforated supporting wall 16. Any superfluous water flowing over upon the transversely inclined wall 23 will be discharged through the outlet spout or tube 24. It will be observed that the frame 14 is sufficiently long to accommodate two of the steam generating chambers, and at an intermediate point a supporting bar 26 connects the outer longitudinal side of the metal frame bar 14 with the table top 15. In arranging the steam generating chambers in place, the depending walls of the water receiving chamber extend downwardly through the supporting frame 14 and the flanges 19 rest upon the metal supporting frame and on the inner edge of the table top 15, as clearly shown in Fig. 2.

In order to support the cans or containers to be hereinafter described, in spaced relation to the surface of the perforated wall 16, I provide the wire mats indicated at 27, so that the steam rising through the perforations 16 will contact with all portions of the container walls and uniformly heat the contents of the containers.

In baking the bread, I preferably mold the same into cylindrical-shaped loaves, by compressing the dough compound within a longitudinally split resilient metal shell 28, said shell being open at its opposite ends. After the dough has been compressed until the edges of said shell overlap, the caps or closures 29 are applied to the opposite ends of the shell so that the latter is maintained in its contracted form and the dough held in a relatively solid compressed state. The containers are then arranged upon the wire plate or mat 27 in slightly spaced relation to each other and finally the hood or cover 30 is placed over said container. The gas issuing from the burners 12 is then ignited, the flames contacting with the walls 21 and 22 and causing the water in the chambers 20 to boil. Thus, generated steam which rises through the perforations in the wall 16 is retained within the hood or cover 30. It will be observed that the steam will contact with all portions of the container walls so that they will be uniformly heated throughout and such heat transmitted to the contents of said containers. The waters of condensation from the steam will collect upon the plate 16 and flow back through the openings therein to the water chamber or out through the spout or tube 24.

From the foregoing description, taken in connection with the accompanying drawings, the construction, manner of use and several advantages of the invention will be clearly and fully understood. I have found the apparatus highly satisfactory and convenient for the baking of bread from my improved whole grain food composition disclosed in the application hereinbefore referred to, though it is, of course, apparent that the cooker may also be employed for various other purposes in the preparation of edibles for human consumption. I have herein disclosed two of the steam generating chambers; but it is obvious that they may be multiplied in number, as desired, so that a large number of loaves of bread can be baked at the same time, or only a single one of the steam chambers may be provided for household use. Furthermore, while I have found the special form of container herein disclosed particularly convenient and satisfactory for the baking of bread, in that it may be easily cleaned and maintained in a thoroughly sanitary condition, it is manifest that the invention itself is not limited to use in connection with any particular type of food container. The apparatus is also susceptible of many other modifications in the form, proportion and arrangement of its several concomitant parts and I, therefore, reserve the privilege of adopting all such legitimate changes as may be fairly embodied within the spirit and scope of the invention as claimed.

Having thus fully described my invention, what I desire to claim and secure by Letters Patent is:—

1. In an apparatus of the character described, a steam generating chamber having downwardly inclined converging bottom walls and a transversely inclined outwardly extending wall disposed downwardly from the upper edge of one of said bottom walls and provided with an overflow outlet, a perforated supporting plate arranged above said chamber, a filling funnel connected to one end of the chamber at the lowest point thereof, means arranged beneath the bottom walls of the chamber for heating the same, and a hood to inclose a plurality of food containers mounted upon said perforated wall.

2. In an apparatus of the character described, a steam generating chamber having downwardly inclined converging bottom walls and a transversely inclined outwardly extending wall disposed downwardly from the upper edge of one of said bottom walls and provided with an overflow outlet, a perforated supporting plate arranged above said chamber, a filling funnel connected to one end of the chamber at the lowest point thereof, means arranged beneath the bottom walls of the chamber for heating the same, a wire mat adapted to be arranged upon the perforated wall to support a plurality of food containers, and a hood or cover adapted to be arranged over and inclose the containers.

3. An apparatus of the character described including a supporting frame, a steam generating chamber having a marginal vertical wall and downwardly inclined converging bottom walls, a wall inclined outwardly and downwardly from the upper edge of one of the bottom walls to one of the longitudinal marginal walls, the upper edges of said marginal walls being outwardly flanged to rest upon the supporting frame, a perforated wall arranged above the steam chamber within said marginal walls, a filling funnel connected to one end of the steam chamber at the lowest point thereof, a wire mat adapted to be arranged upon said perforated wall, and a hood or cover adapted to be arranged over and inclose a plurality of food containers disposed upon said mat.

In testimony whereof I hereunto affix my signature in the presence of two witnesses.

BERTHA LEIBBRANDT.

Witnesses:
I. BATCHELDER,
NEYDA B. HOUX.

Copies of this patent may be obtained for five cents each, by addressing the "Commissioner of Patents, Washington, D. C."